Patented Feb. 22, 1938

2,108,937

UNITED STATES PATENT OFFICE 2,108,937

METHOD FOR THE PRODUCTION OF ARALKYL HALIDES

Lloyd H. Fisher, deceased, late of Wilmington, Del., by Anson B. Nixon, administrator, Holly Oak, Del., assignor to Hercules Powder Company, Wilmington, Del., a corporation of Delaware No Drawing. Application March 19, 1935, Serial No. 11,830

19 Claims. (Cl. 260—160)

This invention relates to the production of aralkyl halides and more particularly to their production from di-aralkyl ethers. In one embodiment this invention is directed to the production of aralkyl halides from crude mixtures containing di-aralkyl ethers, such as the crude mixtures which are recovered in the production of aralkyl ethers of cellulose.

In the production of aralkyl ethers of cellulose, as, for example, benzyl cellulose, phenylethyl cellulose, etc., alkali cellulose is treated with an aralkyl halide, as benzyl chloride, phenylethyl chloride, the corresponding bromides or iodides, etc. In addition to the aralkyl ether of cellulose, which is the desired reaction product, there are formed various by-products, principally the aralkyl alcohol and the di-aralkyl ether corresponding to the aralkyl halide employed.

These by-products are of little commercial value, and it is customary to treat the crude reaction mixture, after the separation of the aralkyl ether of cellulose, so as to produce therefrom aralkyl halides which can be used once more in the production of the cellulose ether. Thus, for example, U. S. Patent 1,872,227 to Bennett et al., discloses a method of treating the crude reaction mixture resulting from the benzylation of cellulose with hydrogen chloride to convert the benzyl alcohol present to benzyl chloride. This treatment, however, due to the relatively low temperature employed, has no effect upon the dibenzyl ether present in the mixture, and the same patentees in U. S. Patent 1,911,667 disclose chlorination of the residue left after treatment in accordance with their earlier patent in order to break down the dibenzyl ether. By such treatment only one molecule of benzyl chloride is formed for each molecule of dibenzyl ether, however; a loss of one half the potential yield of benzyl chloride.

In accordance with this invention it has been found that a di-aralkyl ether, as, for example, dibenzyl ether, diphenylethyl ether, etc. may be converted into the corresponding aralkyl halide by treatment with a hydrogen halide, as, for example, hydrogen chloride, hydrogen bromide, hydrogen iodide, etc., in the presence of a catalyst, such as, for example, a heavy metal halide as zinc chloride, antimony trichloride, ferric chloride, their bromides and iodides, etc. The reaction may also be effected in the absence of a catalyst by operating at a temperature above 100° C., although the yield will be less than when a catalyst is employed. Thus, in accordance with this invention a crude reaction mixture from the production of an aralkyl ether of cellulose and containing an aralkyl alcohol and a di-aralkyl ether may be treated with a hydrogen halide in the presence of a catalyst, as, for example, a heavy metal halide, or at temperatures above 100° C. in the absence of a catalyst, with the consequent conversion of both the aralkyl alcohol and di-aralkyl ether to aralkyl halide, two molecules of aralkyl halide being formed for each molecule of di-aralkyl ether converted.

The method in, accordance with this invention broadly comprises, therefore, the treatment of a di-aralkyl ether, either alone or in admixture with other materials, with a hydrogen halide, and more specifically the treatment of the crude mixture obtained by aralkylation of cellulose with a hydrogen halide for the conversion of the di-aralkyl ether contained therein. The treatment may be carried out in the absence of a catalyst at temperatures above 100° C., preferably at a temperature of about 115° C. to about 120° C.; or the treatment may be carried out in the presence of a catalyst, as, for example, a heavy metal halide, at lower temperatures, although the higher temperatures may of course be employed when operating with a catalyst, and the reaction will indeed desirably be carried out at an elevated temperature, for example, from about 80° to about 150° C., in order to obtain a practical reaction rate. Pressure has little effect upon the reaction, and the reaction may be carried out well at atmospheric pressure, or, if desired, at pressures up to fifteen atmospheres.

The hydrogen halide may be used in the gaseous phase, or may be used in aqueous solution, the latter procedure usually being more convenient. Desirably the aqueous solution will be rather concentrated. Where a catalyst is employed the amount used will preferably be determined by the amount of di-aralkyl ether present and also, when the hydrogen halide is in aqueous solution, by the quantity of water present, since in the presence of water the catalyst is fully effective only in larger amounts. For example, when a dry hydrogen halide is used the catalyst will preferably be employed in from about ½ to about 2% of the amount of di-aralkyl ether. When, however, the hydrogen halide is present in aqueous solution, it is desirable to employ an amount of catalyst within the range of about 10% to 40% of the amount of water present. The hydrogen halide will preferably be used, in aqueous solution, at a concentration of from about 10% to about 50%. It is to be understood, however, that these ratios and amounts are not critical with respect to the method in accordance with this invention, but are described as illustrative of preferred procedure.

Since the reaction occurs in a heterogenous mixture, it is desirable to provide efficient agitation during the reaction. The duration of the reaction depends upon the temperature, the rate at which gaseous hydrogen halide is led into the reaction mixture or the amount and concentration of aqueous solution employed, the pressure, and amount of catalyst present. Usually the reaction is complete in from about ¼ to 2 hours.

No particular type of apparatus need be employed. If the reaction is carried out under pressure, suitable reaction equipment will, of course, be used.

Purification of the reaction product is simple. The crude reaction product may be washed with water to remove acid and catalyst, and if desired with dilute alkali until neutral, and is then distilled, preferably in vacuo, and the aralkyl halide produced collected.

The following examples are illustrative of practical procedure in accordance with this invention.

*Example I.*—79 g. dibenzyl ether and 1.0 g. of zinc chloride were placed in a flask and heated to 100–140° C. A rapid stream of hydrogen chloride was passed into the material, with mechanical stirring for four hours. This material was then water washed to remove the acid and zinc chloride, and then vacuum distilled. The total amount of benzyl chloride theoretically obtainable was 97.1 g., and 63.1 g. of benzyl chloride was actually obtained. This is a conversion of 65%.

*Example II.*—A crude benzylation residue containing benzyl chloride, benzyl alcohol and benzyl ether was treated with hydrochloric acid, in the presence of zinc chloride, as described above. The input was 691 g.:

| Input | Theo. output | Actual yield |
|---|---|---|
| Benzyl chloride 38.8%_____ 268.0 g. | Benzyl chloride_____ 268.0 g. | |
| Benzyl alcohol 9.6%_____ 66.4 g. | Benzyl chloride_____ 77.0 g. | |
| Benzyl ether 51.6%_____ 356.6 g. | Benzyl chloride_____ 455.0 g. | |
| 69.0 g. | 800.0 g. | 610.0 g. |

There was obtained a yield of 610 g. of benzyl chloride. If the conversion of benzyl alcohol to benzyl chloride was complete, then the conversion of benzyl ether to benzyl chloride was about 60%.

It will be understood that the details and examples hereinbefore set forth are illustrative only, and that the invention as broadly described and claimed is in no way limited thereby.

What is claimed and desired to be protected by Letters Patent is:

1. The method of producing an aralkyl halide which includes heating a di-aralkyl ether with a hydrogen halide at a temperature above 100° C.

2. The method of producing an aralkyl halide which includes heating a di-aralkyl ether with a hydrogen halide at a temperature of from about 115° to about 120° C.

3. The method of producing an aralkyl halide which includes heating a di-aralkyl ether with a hydrogen halide in the presence of a heavy metal halide.

4. The method of producing an aralkyl halide which includes heating a di-aralkyl ether with a hydrogen halide in the presence of a heavy metal halide selected from the group consisting of zinc chloride, antimony trichloride, and ferric chloride.

5. The method of producing an aralkyl halide which includes heating a di-aralkyl ether with an aqueous solution of a hydrogen halide in the presence of a heavy metal halide.

6. The method of producing an aralkyl halide which includes heating a di-aralkyl ether with a hydrogen halide in the presence of a heavy metal halide at a temperature of from about 80° to about 150° C.

7. The method of producing an aralkyl halide which includes heating dibenzyl ether with hydrogen chloride at a temperature above 100° C.

8. The method of producing an aralkyl halide which includes heating dibenzyl ether with hydrogen chloride at a temperature of from about 115° to about 120° C.

9. The method of producing an aralkyl halide which includes heating dibenzyl ether with hydrogen chloride in the presence of a heavy metal halide.

10. The method of producing an aralkyl halide which includes heating dibenzyl ether with hydrogen chloride in the presence of a heavy metal halide selected from the group consisting of zinc chloride, antimony trichloride, and ferric chloride.

11. The method of producing an aralkyl halide which includes heating dibenzyl ether with an aqueous solution of hydrogen chloride in the presence of a heavy metal halide.

12. The method of producing an aralkyl halide which includes heating dibenzyl ether with hydrogen chloride in the presence of a heavy metal halide at a temperature of from about 80° to about 150° C.

13. The method of producing an aralkyl halide which includes heating a di-aralkyl ether with a hydrogen halide under superatmospheric pressure and in the presence of a heavy metal halide.

14. The method of producing an aralkyl halide which includes heating dibenzyl ether with hydrogen chloride under superatmospheric pressure and in the presence of a heavy metal halide.

15. The method of producing benzyl chloride which includes heating dibenzyl ether with an aqueous solution of hydrogen chloride at a temperature within the range of about 80° C. to about 150° C. in the presence of a heavy metal halide selected from the group consisting of zinc chloride, antimony trichloride and ferric chloride.

16. The method of producing an aralkyl halide which comprises heating a diaralkyl ether with a hydrogen halide in the presence of a heavy metal halide at an elevated temperature below the decomposition temperature of the reactants but above 80° C.

17. The method of producing benzyl chloride which comprises heating dibenzyl ether with hydrogen chloride in the presence of a heavy metal chloride at an elevated temperature below the decomposition temperature of the reactants but above 80° C.

18. The method of producing an aralkyl halide which comprises heating a diaralkyl ether with a hydrogen halide at an elevated temperature below the decomposition temperature of the reactants, but above 100° C.

19. The method of producing benzyl chloride which comprises heating dibenzyl ether with hydrogen chloride at an elevated temperature below the decomposition temperature of the reactants, but above 100° C.

ANSON B. NIXON,
*Administrator of the Estate of Lloyd H. Fisher, Deceased.*